(12) United States Patent
Shalvi (10) Patent No.: US 8,473,780 B2
(45) Date of Patent: Jun. 25, 2013

(54) EFFICIENT DATA STORAGE IN STORAGE DEVICE ARRAYS

(75) Inventor: Ofir Shalvi, Ra'anana (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/539,734

(22) Filed: Jul. 2, 2012

(65) Prior Publication Data

US 2012/0272000 A1    Oct. 25, 2012

Related U.S. Application Data

(62) Division of application No. 12/579,432, filed on Oct. 15, 2009, now Pat. No. 8,239,734.

(60) Provisional application No. 61/105,580, filed on Oct. 15, 2008.

(51) Int. Cl.
*G06F 11/00* (2006.01)

(52) U.S. Cl.
USPC .......................................... 714/6.23; 711/162

(58) Field of Classification Search
USPC ........................... 714/6.2, 6.23, 6.24; 711/162
See application file for complete search history.

(56) References Cited

U.S. PATENT DOCUMENTS

| 7,802,063 | B1 * | 9/2010 | Chatterjee et al. | 711/156 |
|---|---|---|---|---|
| 7,971,013 | B2 * | 6/2011 | Burkey | 711/162 |
| 8,239,645 | B1 * | 8/2012 | Sade et al. | 711/162 |
| 2005/0044444 | A1 * | 2/2005 | Grubbs et al. | 714/5 |
| 2006/0179343 | A1 * | 8/2006 | Kitamura | 714/6 |
| 2009/0327603 | A1 * | 12/2009 | McKean et al. | 711/114 |
| 2011/0246821 | A1 * | 10/2011 | Eleftheriou et al. | 714/15 |
| 2012/0215966 | A1 * | 8/2012 | Fukuyama | 711/103 |
| 2012/0254508 | A1 * | 10/2012 | Walls | 711/103 |

* cited by examiner

*Primary Examiner* — Marc Duncan
(74) *Attorney, Agent, or Firm* — Meyertons, Hood, Kivlin, Kowert & Goetzel, P.C.

(57) ABSTRACT

A method for data storage includes encoding data with an inter-device Error Correction Code (ECC), and sending the encoded data for storage on two or more storage devices. The data to be stored on each of the storage devices, and which has been encoded with the inter-device ECC, is encoded with an intra-device ECC, and the data encoded with the inter-device and intra-device ECCs is stored on the storage device. After storing the data, at least part of the stored data is retrieved and output by decoding the intra-device and inter-device ECCs, while using information related to one of the intra-device and inter-device ECCs in decoding the other of the intra-device and inter-device ECCs.

14 Claims, 4 Drawing Sheets

EFFICIENT DATA STORAGE IN STORAGE DEVICE ARRAYS

CROSS-REFERENCE TO RELATED APPLICATIONS

This application is a division of U.S. patent application Ser. No. 12/579,432, filed Oct. 15, 2009, which claims the benefit of U.S. Provisional Patent Application 61/105,580, filed Oct. 15, 2008. The disclosures of all these related applications are incorporated herein by reference.

FIELD OF THE INVENTION

The present invention relates generally to data storage, and particularly to methods and systems for storing data in storage device arrays.

BACKGROUND OF THE INVENTION

Various data storage systems employ multiple storage devices, such as Hard Disk Drives (HDD), Solid State Disks (SSD) or solid-state memory devices, for storing data. Several techniques have been developed for storing data reliably, and for recovering from storage device failures. For example, Redundant Array of Inexpensive Disks (RAID) is a family of storage schemes, which store data redundantly and enable recovery from a failure of one or more of the storage devices.

As another example, U.S. Patent Application Publication 2008/0115017, whose disclosure is incorporated herein by reference, describes fault-tolerant, redundancy-based data-storage systems. These techniques use disk-controller-implemented error detection and error correction, at the disk-block level, and RAID-controller-implemented data-redundancy methods, at the disk and disk-stripe level, in order to provide error detection and error correction.

U.S. Patent Application Publication 2002/0174295, whose disclosure is incorporated herein by reference, describes a file system that includes a plurality of disk drives for storing parity groups, each parity group comprising storage blocks. The storage blocks include one or more data blocks and a parity block associated with the data blocks. Each of the storage blocks is stored on a separate disk drive such that no two storage blocks from a given parity group reside on the same disk drive. A recovery module dynamically recovers data lost when a disk drive becomes unavailable. The recovery module produces a reconstructed block by using information in the remaining storage blocks of a parity group corresponding to an unavailable storage block, and stores the reconstructed block on a functioning drive.

U.S. Patent Application Publication 2008/0209304, whose disclosure is incorporated herein by reference, describes a redundant array of independent devices, which uses convolution encoding to provide redundancy of the striped data written to the devices. No parity is utilized in the convolution encoding process. Trellis decoding is used for both reading the data from the array and for rebuilding missing encoded data from one or more failed devices, based on a minimal, and preferably zero, Hamming distance for selecting the connected path through the trellis diagram.

SUMMARY OF THE INVENTION

An embodiment of the present invention provides a method for data storage, including:

encoding data with an inter-device Error Correction Code (ECC), and sending the encoded data for storage on two or more storage devices;

encoding the data to be stored on each of the storage devices, and which has been encoded with the inter-device ECC, with an intra-device ECC, and storing the data encoded with the inter-device and intra-device ECCs on the storage device;

after storing the data, retrieving and outputting at least part of the stored data by decoding the intra-device and inter-device ECCs, while using information related to one of the intra-device and inter-device ECCs in decoding the other of the intra-device and inter-device ECCs.

In some embodiments, the storage devices include at least one device type selected from a group of types consisting of a magnetic disk, a Solid State Disk (SSD), a Direct Access Storage Device (DASD), a solid state memory device, a memory chip, a Multi-Chip Package (MCP) memory device and a disk sub-array. In an embodiment, the information is related to the inter-device ECC, and retrieving the at least part of the data includes making an attempt to decode the intra-device ECC independently of the information, and decoding the intra-device ECC using the information responsively to a failure of the attempt. In another embodiment, encoding the data with the intra-device ECC includes generating intra-device redundancy bits, and the information includes the intra-device redundancy bits. Decoding the intra-device and inter-device ECCs may include exporting the intra-device redundancy bits from one or more of the storage devices.

In a disclosed embodiment, decoding the intra-device ECC includes computing soft metrics of respective bits of the at least part of the data, and the information includes the soft metrics. In another embodiment, encoding the data with the inter-device ECC includes dividing the data into pages including data bits, computing a respective parity bit for the data bits in each bit position within the pages, sending the pages for storage on respective ones of the storage devices, and sending the parity bits for storage on another of the storage devices. In an embodiment, decoding the intra-device and inter-device ECCs includes identifying at least one bit position for which the data bits read from the storage devices are inconsistent with the respective parity bit, and decoding the intra-device ECC based on the identified at least one bit position.

In yet another embodiment, decoding the intra-device ECC includes modifying soft metrics of one or more of the data bits located in the identified bit positions in the pages, and decoding the intra-device ECC based on the modified soft metrics. In still another embodiment, decoding the intra-device ECC includes modifying bit values of one or more of the data bits located in the identified bit positions in the pages, and decoding the intra-device ECC based on the modified bit values.

In some embodiments, encoding the data with the inter-device and intra-device ECCs includes encoding the data with a systematic ECC to produce redundancy bits, and dividing the redundancy bits for storage among the two or more storage devices, decoding the intra-device ECC includes decoding a portion of the data stored on a given storage device using only a subset of the redundancy bits that are stored on the given storage device, and decoding the inter-device ECC includes decoding the entire data using the redundancy bits stored on the two or more storage devices. In an embodiment, the systematic ECC includes a Low Density Parity Check (LDPC) code.

In a disclosed embodiment, decoding the intra-device and inter-device ECCs includes performing alternating decoding iterations of the intra-device and inter-device ECCs, and transferring soft metrics between the decoding iterations of the intra-device and inter-device ECCs. In another embodiment, encoding the data with the inter-device ECC includes mirroring the data in the two or more storage devices, and decoding the intra-device and inter-device ECCs includes computing soft metrics of respective bits in each of the storage devices, combining the soft metrics of corresponding bits stored on the two or more storage devices, and decoding the intra-device ECC using the combined soft metrics. In an embodiment, the information is related to the inter-device ECC, and decoding the intra-device and inter-device ECCs includes sending the information to a given storage device, and decoding the intra-device ECC in the given storage device responsively to the information.

There is additionally provided, in accordance with an embodiment of the present invention, a method for data storage, including:

receiving data items having respective logical storage locations for storage on a storage device;

storing the data items, together with respective indications of the logical storage locations, at successive available physical storage locations on the storage device; and retrieving the data items from the storage device by reading the data items and the respective indications sequentially from the storage device, and outputting the read data items according to the indications.

In an embodiment, the data items include parity pages, which are produced from data pages that are stored on at least one other storage device.

There is also provided, in accordance with an embodiment of the present invention, a method for data storage, including:

storing data items having respective logical storage locations on a first storage device;

backing-up the data items on a second storage device by storing the data items, together with respective indications of the logical storage locations, at successive available physical storage locations on the second storage device; and upon a failure in the first storage device, restoring the data items from the second storage device by reading the data items and the respective indications sequentially from the second storage device, and storing the read data items on a third storage device according to the indications.

In some embodiments, the first storage device includes a Solid State Disk (SSD). In some embodiments, the second storage device includes a Hard Disk Drive (HDD). In an embodiment, backing-up the data items includes holding a data structure indicating the available physical storage locations on the second storage device, and storing the data items at the successive available physical storage locations includes skipping physical storage locations that are indicated by the data structure as unavailable. In another embodiment, storing and backing-up the data items include notifying one of the first and second storage devices whether a given data item comprises data or redundancy information.

There is additionally provided, in accordance with an embodiment of the present invention, apparatus for data storage, including:

two or more storage devices, each of which is configured to encode data with an intra-device Error Correction Code (ECC) and to store the encoded data on the storage device;

a controller, which is configured to encode input data with an inter-device ECC, to send the input data encoded with the inter-device ECC to the two or more storage devices, for subsequent encoding with the intra-device ECC and storage; and a joint decoder, which is configured to retrieve and output at least part of the stored input data by decoding the intra-device and inter-device ECCs, while using information related to one of the intra-device and inter-device ECCs in decoding the other of the intra-device and inter-device ECCs.

There is additionally provided, in accordance with an embodiment of the present invention, apparatus for data storage, including:

a storage device; and a controller, which is configured to receive data items having respective logical storage locations for storage on the storage device, to store the data items, together with respective indications of the logical storage locations, at successive available physical storage locations on the storage device, and to retrieve the data items from the storage device by reading the data items and the respective indications sequentially from the storage device, and outputting the read data items according to the indications.

There is further provided, in accordance with an embodiment of the present invention, apparatus for data storage, including:

first and second storage devices; and a controller, which is configured to store data items having respective logical storage locations on the first storage device, to back-up the data items on the second storage device by storing the data items, together with respective indications of the logical storage locations, at successive available physical storage locations on the second storage device, and, upon a failure in the first storage device, to restore the data items from the second storage device by reading the data items and the respective indications sequentially from the second storage device, and to store the read data items on a third storage device according to the indications.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for data storage in multiple storage devices. These methods and systems encode the data for storage using two types of Error Correction Codes (ECC), which are referred to as inter-device ECC and intra-device ECC. The inter-device ECC introduces redundancy into the data before it is distributed among the different storage devices. The intra-device ECC, on the other hand, is applied by each individual storage device to the portion of the data that is to be stored on that device (and that is already encoded with the inter-device ECC).

The methods and systems described herein decode the intra-device and inter-device ECCs jointly, by using information related to one ECC in decoding the other. Joint decoding of the intra-device and inter-device ECCs improves the decoding performance, and thus the data storage reliability of the system, in comparison with independent decoding of each ECC. Several examples of joint decoding methods are described hereinbelow. Example interfaces that enable these methods are also described.

Other methods and systems that are described herein enable fast storage of data items on storage devices having relatively slow random access time, such as Hard Disk Drives (HDD). In some embodiments, data items having respective logical addresses are accepted for storage. The data items are stored by writing them sequentially, in successive available physical storage locations on the storage device, regardless of whether the logical addresses of the data items are sequential or not. When a given data item is stored on the storage device, an indication of the logical address of this data item is stored together with the data. When retrieving a given data item, the corresponding logical address is retrieved and used.

When using these methods in a HDD, the sequential storage reduces the amount of mechanical movement required from the HDD head, and thus reduces the storage time. Generally, however, this technique can be used to improve the random access speed of various other types of storage devices. Several example applications and system configurations that use this technique are described below, such as hybrid HDD/SSD configurations. Since the disclosed methods enable deploying low-cost and high-endurance storage devices (e.g., HDD) for fast random access applications, they are able to reduce the cost and increase the endurance of storage systems.

Data Storage and Retrieval Using Inter-Disk And Intra-Disk ECC

Figure 1:
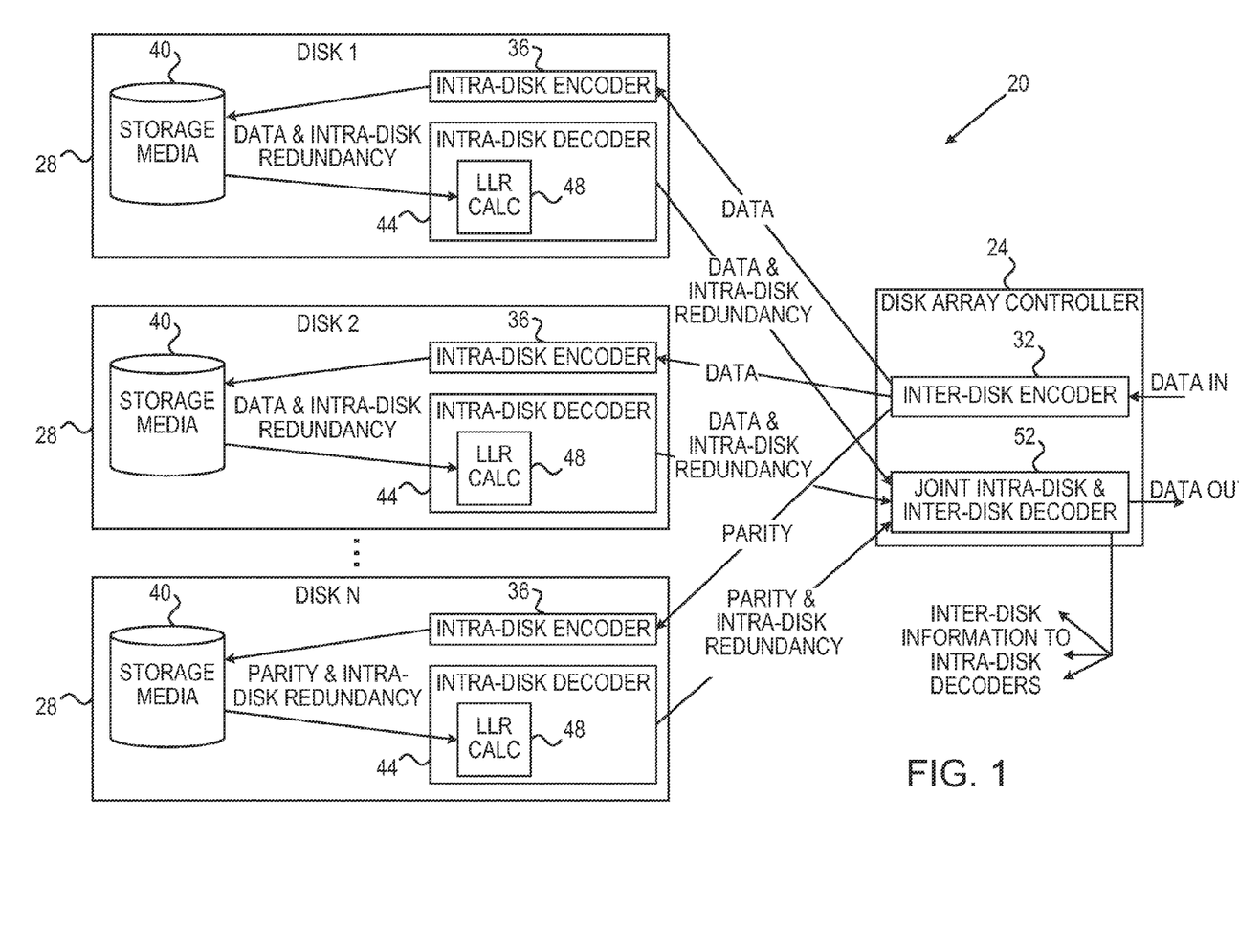
FIG. 1 is a block diagram that schematically illustrates a data storage system, in accordance with an embodiment of the present invention.

FIG. 1 is a block diagram that schematically illustrates a data storage system 20, in accordance with an embodiment of the present invention. System 20 comprises a disk array controller 24, which stores data in two or more storage devices 28, in the present example Hard Disk Drives (HDD). The number of storage devices is denoted N. Any desired number of storage devices can be used. Alternatively to magnetic storage disks, the storage devices may comprise any other suitable type of storage devices, such as Solid State Disks (SSD), Direct Access Storage Devices (DASD) or RAID sub-arrays. Further alternatively, the methods and systems described herein can also be used in a system comprising a memory controller that controls an array of individual solid state memory devices, such as a group of Flash devices or other non-volatile devices. In this embodiment, each memory chip is regarded as a separate storage device. The storage devices of system 20 may be of a single type or of mixed types, such as a combination of one or more HDD and one or more SSD.

In order to increase storage reliability and recover from disk failures, system 20 encodes the data stored in storage devices 28 using two types of Error Correction Codes (ECC). The first ECC, which is referred to herein as inter-disk or inter-device ECC, introduces redundancy into the data before it is distributed among the different storage devices. The inter-disk ECC is applied by an inter-disk encoder 32 in the array controller. The second ECC, which is referred to herein as intra-disk or intra-device ECC, is applied by each individual storage device, to the data that is to be stored on that device. Each storage device 28 comprises an intra-disk encoder 36, which encodes the data received for storage on that storage device with the intra-disk ECC. The intra-disk encoder in each storage device typically applies the intra-disk ECC independently of the intra-disk encoding performed in the other storage devices.

Each device 28 further comprises storage media 40 (e.g., magnetic media or solid state memory) for storing the data. In some embodiments, each device 28 comprises an intra-disk decoder 44 for decoding the intra-disk ECC. The intra-disk decoder may comprise a Log-Likelihood Ratio (LLR) calculation unit, whose role is explained in detail further below.

In a typical flow, controller 24 receives data for storage from a host system or other source. Inter-disk encoder 32 in controller 24 encodes the data with the inter-disk ECC, and distributes the encoded data among devices 28 for storage. Each device 28 receives part of the data (which is already encoded with the inter-disk ECC), encodes this data with the intra-disk ECC, and stores the data in media 40.

In order to retrieve certain data, the storage device on which the data is stored reads the data from media 40, and decodes the intra-disk ECC using intra-disk decoder 44. The storage device sends the raw data read from media 40 (including both data bits and the redundancy introduced by the intra-disk ECC) to controller 24.

Controller 24 comprises a joint ECC decoder 52, which performs joint decoding of the intra-disk ECC and the inter-disk ECC using the raw data sent from storage devices 28. The joint decoder typically uses information derived from one ECC in order to decode the other. Several examples of joint ECC decoding methods are described further below. These techniques use information derived from the intra-disk ECC to decode the inter-disk ECC, or vice versa. Joint decoding of the intra-disk and inter-disk ECC is extremely powerful in recovering from data errors as well as disk failures.

Note that generally each storage device 28 decodes the intra-disk ECC locally using decoder 44, in addition to the joint decoding performed by decoder 52 in the controller. In some embodiments, each storage device attempts to decode the intra-disk ECC locally, and joint decoding is reverted to only in the event of decoding failure in a device. When using this technique, the raw data is sent to controller 24 only if the storage device fails to decode the intra-disk ECC. Otherwise, the device sends to the controller only the data after intra-disk ECC decoding. As a result, data throughput over the interfaces between storage devices 28 and controller 24 is reduced. Additionally or alternatively, intra-disk decoders 44 may compute soft metrics, e.g., LLRs, which are later used by joint decoder 52 in the joint ECC decoding process.

Each of the inter-disk and the intra-disk ECC may comprise any suitable type of ECC, such as a parity code, a Reed-Solomon code, a Bose-Chaudhuri-Hocquenghem code, a Low Density Parity Check (LDPC) code, a Turbo code, a Turbo Product Code (TPC), a Trellis Coded Modulation (TCM) code, an incremental code or any other suitable type of ECC. The inter-disk and intra-disk ECC may generally be of the same type or of different types. When belonging to the same code type, the intra-disk and inter-disk ECC may have the same or different attributes (e.g., LDPC codes with different parity equations, or convolution codes with different levels of puncturing).

In the description that follows, the inter-disk ECC comprises a parity code. In this scheme, inter-disk encoder 32 divides the data for storage into N-1 pages. Encoder 32 produces a parity page, in which each bit is set to be the XOR of the respective bits in the N-1 data pages. In other words, the $k^{th}$ bit of the parity page is set to be the XOR of the N-1 $k^{th}$ bits of the N-1 data pages. N-1 of storage devices 28 are regarded as data devices, and the $N^{th}$ device is regarded as a parity device. Controller 24 sends the N-1 data pages for storage in the N-1 data devices, respectively. The parity page is sent for storage in the parity device. (Generally, the N storage devices may serve the roles of data device and parity device. In other words, a given storage device 28 may serve as a data device for certain data and as a parity device for other data.) When using this scheme, the data can be recovered without error in the event of failure of any single storage device.

In some embodiments, intra-disk decoders 44 decode the intra-disk ECC using hard decoding, in which case the raw data that is sent from storage devices 28 to controller 24 comprises the data bits and the intra-disk ECC redundancy bits. In alternative embodiments, intra-disk decoders 44 decode the intra-disk ECC using a soft decoding process, which operates on soft metrics of the stored bits. The soft metric of a given bit typically comprises a value, which is indicative of the confidence level of that bit or a probability that this bit is "0" or "1". In the present example, LLR calculation unit 48 in each disk calculates the LLRs of the bits read from media 40, and intra-disk decoder 40 uses the LLRs as soft metrics for decoding the intra-disk ECC. Alternatively, any other suitable kind of soft metric can be used. The soft metrics may also comprise soft values of the bits, i.e., values that were read from media 40 at a resolution of two or more bits.

In some embodiments, storage devices 28 send the LLRs or other soft metrics to joint decoder 52, and the joint decoder uses these metrics in the joint ECC decoding process. In other words, the raw data sent from storage devices 28 to controller 24 may comprise the LLRs or other soft metrics (possibly in addition to the intra-disk redundancy bits). Certain aspects of ECC decoding using soft metrics are addressed, for example, in PCT International Publications WO 2007/132457 and WO 2008/053472, which are assigned to the assignee of the present patent application and whose disclosures are incorporated herein by reference.

The system configuration shown in FIG. 1 is an example configuration, which is chosen purely for the sake of conceptual clarity. In alternative embodiments, system 20 may have any other suitable configuration that performs joint decoding of the inter-disk and intra-disk ECC. For example, intra-disk decoders 44 in storage devices 28 may be omitted. In this embodiment, ECC decoding is performed exclusively by joint decoder 52 in controller 24. Additionally or alternatively, encoding with the intra-disk ECC need not necessarily be performed by each individual storage device. For example, in some embodiments a single unit (e.g., in the array controller) performs both intra-device ECC encoding of the data to be sent to the different storage devices, as well as inter-device ECC encoding. As noted above, the embodiments described herein refer mainly to disks. The reference to disks, however, is chosen purely by way of example, and the disclosed techniques are similarly applicable to any other suitable type of storage device.

Figure 2:
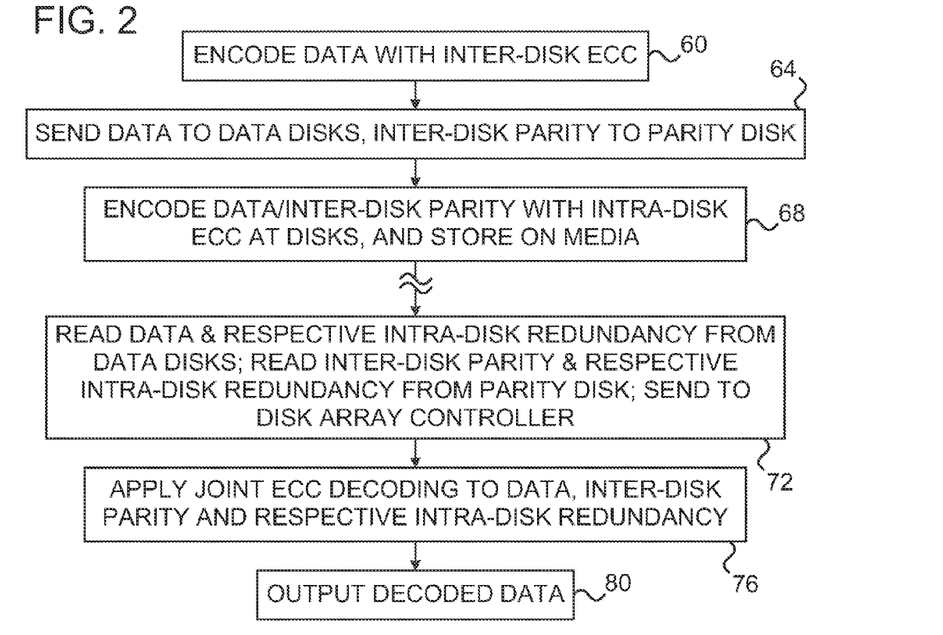
FIG. 2 is a flow chart that schematically illustrates a method for data storage and retrieval, in accordance with an embodiment of the present invention.

FIG. 2 is a flow chart that schematically illustrates a method for data storage and retrieval carried out by system 20, in accordance with an embodiment of the present invention. The method begins with inter-disk encoder 32 in controller 24 encoding data for storage with the inter-disk ECC, at an inter-disk encoding step 60. In the present example, the inter-disk ECC comprises a parity code. Controller 24 sends the data pages to the disks designated as data disks, and the parity page to the disk designated as parity disk, at a storage sending step 64. Each disk 28 encodes the page received from the controller with the intra-disk ECC, at an intra-disk encoding step 68. Each disk stores its respective page on media 40. The intra-disk encoding and storage is typically the same in the data disks and in the parity disk. In some embodiments, each disk is unaware of whether the page it encodes and stores is a data page or a parity page.

At a later time, controller 24 requests to retrieve one or more data pages from one or more disks 28. For example, the controller may receive a request from the host system to retrieve certain data. In order to retrieve the data, disks 28 read and send the data and parity pages, as well as the respective intra-disk redundancy bits, at a readout step 72. Typically, a given disk reads the page in question (which was locally encoded with the intra-disk redundancy) from its respective media 40. The disk sends the page, including the intra-disk redundancy bits, to controller 24.

Upon receiving the information, joint ECC decoder 52 in controller 24 performs joint decoding of the intra-disk and inter-disk ECC, at a joint decoding step 76. Several examples of joint decoding methods that can be used to implement step 76 are explained below. The joint decoding process produces the requested data. Controller 24 outputs the requested data, at an output step 80.

Figure 3:
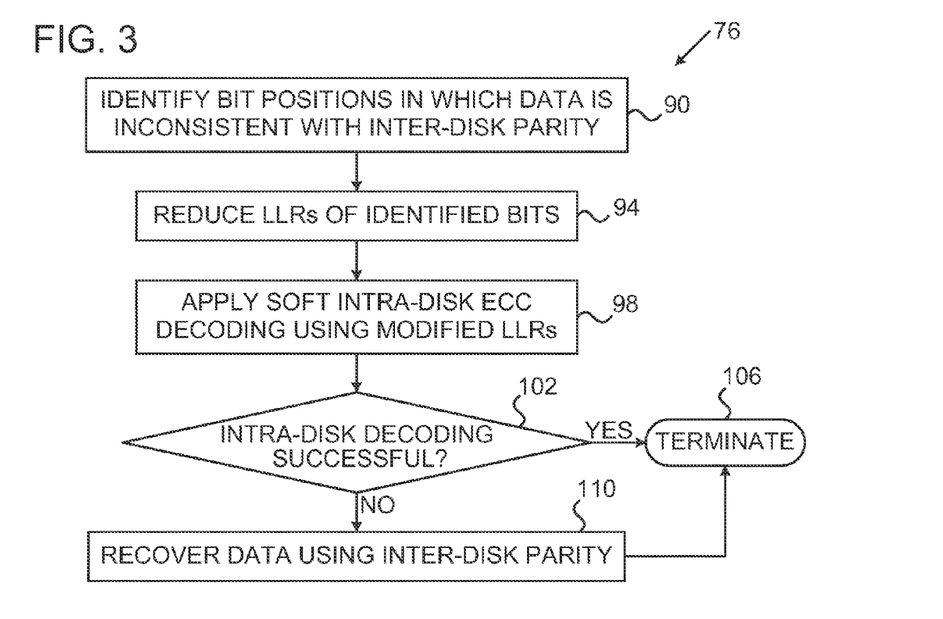
FIGS. 3-5 are flow charts that schematically illustrate methods for joint decoding of inter-disk and intra-disk Error Correction Codes (ECC), in accordance with embodiments of the present invention.

FIG. 3 is a flow chart that schematically illustrates a method for joint decoding of inter-disk and intra-disk ECC, in accordance with an embodiment of the present invention. This method can be used, for example, to implement step 76 of the method of FIG. 2 above. The method of FIG. 3 assumes that intra-disk decoders 40 apply soft decoding using LLRs or other soft metrics, and is typically invoked when a given intra-disk decoder 44 in a given disk 28 fails to decode the intra-disk ECC locally.

The method begins with joint ECC decoder 52 receiving a set of N-1 data pages and a corresponding parity page of the inter-disk ECC. Decoder 52 identifies one or more bit positions in which the data bits are inconsistent with the respective parity bit, at a parity inconsistency detection step 90. The assumption is that the data in these bit positions is regarded as less reliable, and may have been the cause of the intra-disk ECC decoding failure.

Decoder 52 reduces the LLRs of the data bits in the identified bit positions, at a metric reduction step 94. The LLR (or other metric) reduction reflects the lower reliability of these bits. In some embodiments, decoder 52 may set the LLRs in the identified bit positions to zero, or to any other suitable value. Decoder 52 sends the modified LLRs to the intra-disk decoder in question, i.e., the intra-disk decoder which failed to decode the intra-disk ECC. The intra-disk decoder re-attempts to decode the intra-disk ECC using the modified LLRs, at a re-decoding step 98. In an alternative embodiment, the re-decoding operation is carried out in joint decoder 52.

Decoder 52 checks whether the second intra-disk ECC decoding attempt is successful, at a success checking step 102. If successful, the method terminates at a termination step 106. Otherwise, decoder 52 may attempt to recover the data using other means, e.g., using the inter-disk ECC, at an inter-disk decoding step 110. If the data page of a given data disk cannot be recovered, the data pages of the other data disks can be recovered using the inter-disk parity page.

In the method of FIG. 3, information from the inter-disk ECC (identified bit positions in which the data is inconsistent with the inter-disk parity) is used to improve the performance of intra-disk ECC decoding (by modifying the LLRs used for intra-disk ECC decoding).

In an alternative embodiment, for a given bit position identified at step 90 (in which the data is inconsistent with the inter-disk parity), decoder 52 may examine the LLRs of the data bits in this bit position in the different data pages. The joint decoder may flip (reverse) the value of one or more bits having the lowest (poorest) LLR. Then, decoder 52 may perform (or instruct intra-disk decoder 44 to perform) hard intra-disk decoding of the data pages having the flipped bits.

Figure 4:
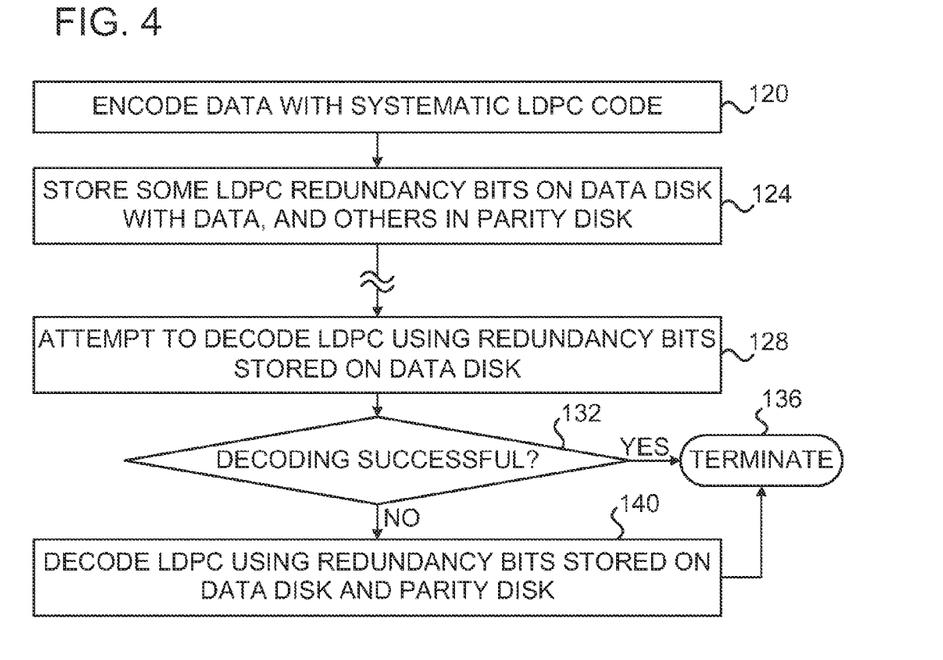

FIG. 4 is a flow chart that schematically illustrates a method for joint decoding of inter-disk and intra-disk ECC, in accordance with another embodiment of the present invention. The method of FIG. 4 uses the fact that some ECC types can be decoded using only part of the redundancy information. An LDPC code, for example, can be decoded (at different performance levels) using different subsets of the redundancy bits added during encoding.

The method begins with inter-disk encoder 32 encoding the data for storage with a systematic LDPC code, at a LDPC encoding step 120. (A systematic code, as is known in the art, is a code that preserves the original data bits and adds redundancy bits to them.) Controller 24 divides the resulting LDPC code word and sends it for storage, at an LDPC storage step 124. The controller divides the LDPC code word so that some of the redundancy bits are stored on the parity disk, and some of the LDPC redundancy bits are stored with the data bits on the data disks. In other words, each data disk stores part of the LDPC redundancy bits in addition to data bits.

When attempting to retrieve the data from a given disk, intra-disk ECC decoder 44 of that disk (or decoder 52) initially attempts to decode the data bits stored locally on the disk using only the redundancy bits that are stored on the same disk, at a local LDPC decoding step 128. Decoder 44 or 52 checks whether the local decoding attempt was successful, at a success checking step 132. If successful, the method terminates at a termination step 136. Otherwise, joint decoder 52 decodes the entire LDPC code word using the data from the other data disks and the parity disk, at a joint LDPC decoding step 140. The joint decoding typically uses the LLRs provided by the different intra-disk ECC decoders.

In the method of FIG. 4, the same LDPC code is used for both intra-disk and inter-disk ECC decoding. The intra-disk decoding process attempts to decode the subset of data bits stored on a given disk using the subset of redundancy bits stored on that disk. The inter-disk decoding process decodes the entire LDPC code word stored on the multiple disks. Although the description above refers to LDPC, the method of FIG. 4 can be used with any other suitable type of ECC, which is capable of decoding a subset of the data bits using a subset of the redundancy bits, such as, for example, incremental codes, punctured convolution codes in which punctured redundancy bits are added in the inter-disk ECC, and Turbo Product Codes (TPC) in which the intra-disk ECC is applied to data rows and the inter-disk ECC is applied to data columns.

In some embodiments, joint decoder 52 may apply iterative product code decoding, i.e., perform alternate intra-disk ECC and inter-disk ECC decoding iterations, while transferring LLR (or other metric values) between the two decoding processes.

As yet another example of joint intra-disk and inter-disk ECC decoding, consider a configuration in which controller 24 mirrors the data to two or more disks 28. In other words, the inter-disk ECC comprises a repetition code. All the disks use the same intra-disk ECC, which is decoded using soft metrics of the data bits (e.g., LLRs). When intra-disk ECC decoding fails in a give disk, the disk transfers the soft metrics to controller 24. If intra-disk ECC decoding fails in all disks, the controller combines (e.g., averages) the soft metrics of corresponding bits in the multiple disks. Intra-disk ECC decoding is then re-attempted (in the controller or in one of the disks) using the combined soft metrics. This technique is effective, for example, in reducing random noise in the data read from media 40.

Further additionally or alternatively, system 20 can apply any other suitable joint decoding process that combines intra-disk and inter-disk ECC decoding.

The above-described joint decoding methods provide superior resilience to impairments (e.g., noise and distortion) in media 40, and therefore improve the endurance, reliability and storage capacity of the system.

Enhanced Intra-Disk ECC Decoding Performance Using Feedback From Inter-Disk ECC

In some embodiments, decoder 52 in controller 24 sends information, which is derived from inter-disk ECC decoding, to intra-disk ECC decoders 44 in disks 28. The intra-disk decoders use this information to improve the performance of the intra-disk ECC decoding process. In some embodiments, the information is sent from controller selectively, e.g., in the event of intra-disk ECC decoding failure.

Figure 5:
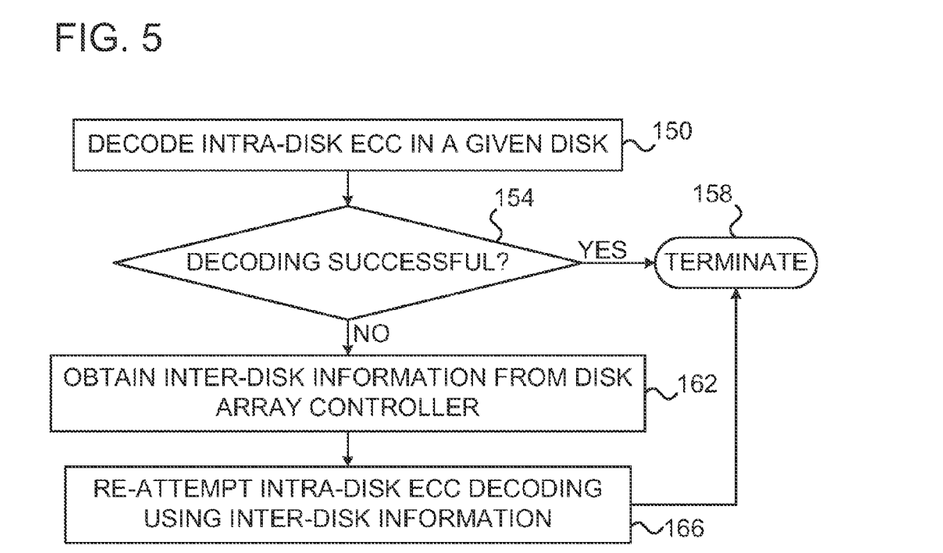

FIG. 5 is a flow chart that schematically illustrates a method for joint decoding of inter-disk and intra-disk ECC, in accordance with an alternative embodiment of the present invention. The method begins with intra-disk decoder 44 in a given disk 28 decoding the intra-disk ECC, at an intra-disk decoding step 150. The intra-disk decoder checks whether the decoding attempt was successful, at a success checking step 154. If successful, the method terminates at a termination step 158.

Otherwise, i.e., if intra-disk ECC decoding has failed, the intra-disk decoder obtains information regarding the inter-disk ECC from controller 24, at an inter-disk information retrieval step 162. The intra-disk decoder then re-attempts to decode the intra-disk ECC using the inter-disk information, at an intra-disk re-decoding step 166.

Various kinds of information related to the inter-disk ECC can be useful for improving the performance of intra-disk ECC decoding. For example, such information may comprise bit positions in which the data bits are inconsistent with the respective inter-disk parity, as described in FIG. 3 above. The intra-disk decoder may use this sort of information by reducing (and specifically setting to zero) the LLRs of these bit positions. Alternatively, the intra-disk decoder may substitute alternative bit values into the identified bit positions (e.g., at random or according to any suitable logic), and reattempt to decode the intra-disk ECC. ECC decoding techniques using bit substitution is described, for example, by Chase in "A Class of Algorithms for Decoding Block Codes with Channel Measurement Information," IEEE Transactions on Information Theory, Volume IT-18, No. 1, January, 1972, pages 170-182, which is incorporated herein by reference.

The method of FIG. 5 is particularly useful when the intra-disk ECC is decoded using a soft decoding process (e.g., soft LDPC decoder), and when the inter-disk ECC comprises a parity code. Nevertheless, this technique can be used with any other suitable intra-disk and inter-disk ECC. In some embodiments, controller 24 and disks 28 support a command interface for transferring information related to the inter-disk ECC from the controller to the disks.

Data Mirroring in Storage Devices of Different Types

In some applications, data is stored in a primary storage device and backed-up (mirrored) in a secondary storage device. It is sometimes desirable to use primary and secondary storage device of different types, e.g., for lowering the overall system cost. For example, it may be beneficial to use a Solid State Disk (SSD) for primary storage and a Hard Disk Drive (HDD) for backup, since HDDs typically have considerably lower cost, larger storage capacity and higher endurance in comparison with SSD. On the other hand, HDDs usually have a significantly slower access time, particularly for random (i.e., non-sequential) programming, because such random access operations involve mechanical head movements in the HDD.

Embodiments of the present invention provide improved methods and systems for data backup and recovery, which enable using slow random-access storage devices for back-up storage, with little or no degradation of the overall system storage speed.

Figure 6:
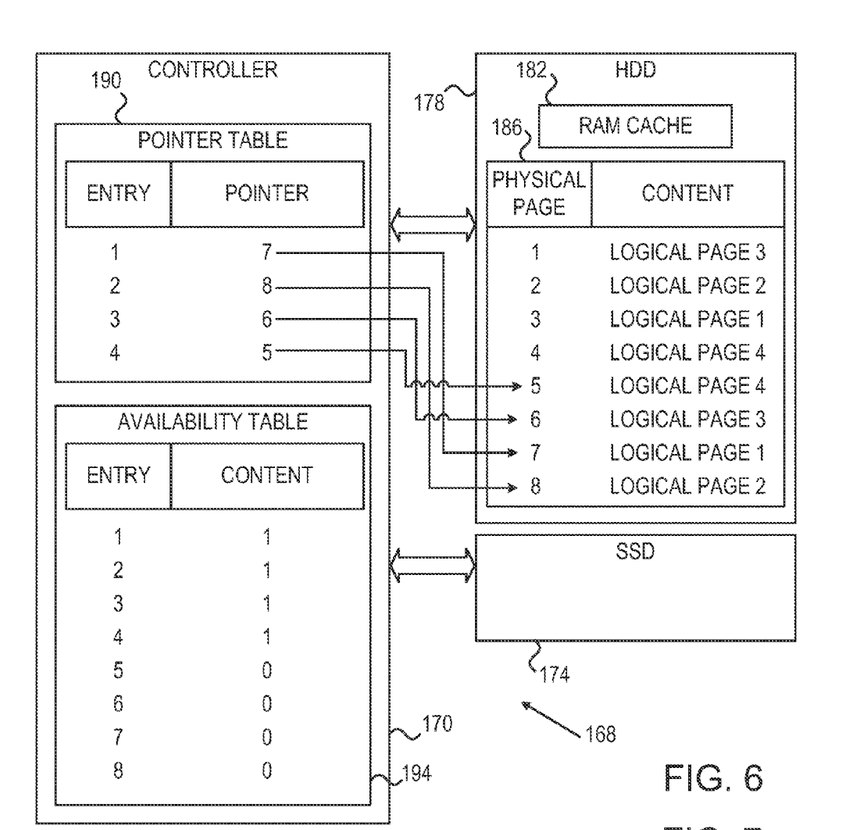
FIG. 6 is a block diagram that schematically illustrates a data storage system, in accordance with an alternative embodiment of the present invention.

FIG. 6 is a block diagram that schematically illustrates a data storage system 168, in accordance with an alternative embodiment of the present invention. System 168 comprises a controller 170, which stores data in a primary storage device 174 and a secondary storage device 178. In the present example, the primary storage device comprises a SSD and the secondary storage device comprises a HDD, although any other suitable types of storage devices can also be used.

Controller 170 stores data pages in SSD 174 according to logical addresses assigned to the data pages. (The description that follows refers to data pages, and to logical and physical addresses. Generally, however, the disclosed techniques can be used with other sorts of data items and in other sorts of logical and physical storage locations.) In addition, controller 170 backs-up each data page in HDD 178.

In the present example, the SSD is capable of storing 25 million pages, each of which is 4 KB in size. The HDD is capable of storing 300 GB of memory in 4 KB pages. These figures are given purely by way of example, and any other suitable capacities and page sizes can also be used.

HDD 178 comprises a Random Access Memory (RAM) cache 182 and magnetic storage media 186. When a certain data page is sent to the HDD for storage, the page is first cached in cache 182 and then copied to a certain physical page on media 186. If a failure occurs in SSD 174 or in the data stored in the SSD, the controller may initiate a restoration process, in which the data is restored from HDD 178 into another SSD.

Since writing and reading of data in media 186 involves mechanical movement of the HDD head, it is highly desirable to write and read the media sequentially, i.e., write and read data into and out of sequential physical pages. Non-sequential programming and readout reduces the HDD access speed considerably. The effect of non-sequential readout is particularly harmful when restoring the data from the HDD. The impact of non-sequential programming is especially noticeable when performing real-time back-up of stored data. The data storage scheme described below enables sequential programming and readout in HDD 178, which reduces unnecessary movement of the HDD head and therefore improves the HDD access time.

In the example of FIG. 6, controller 170 holds two tables, namely a PointerTable 190 and an AvailabilityTable 194. The two tables are typically stored in the controller's RAM. The PointerTable table has an entry for each SSD page (i.e., 25 million entries in the present example). The entry of a given SSD page indicates the physical page in which the most up-to-date copy of this SSD page is backed-up in the HDD. If the SSD page was never programmed, the corresponding PointerTable entry can be marked with "−1" or any other suitable indication.

The AvailabilityTable table has a Boolean (one-bit) entry for each physical page of the HDD. The entry of a given HDD physical page is "0" if the physical page contains valid (up-to-date) data, and "1" otherwise (i.e., if data was never written to this physical page or if the last data backed-up to this physical page was re-written to another physical page). The entry of a given physical page is also set to "0" if the physical page has been identified as a bad page. In other words, the AvailabilityTable of a given HDD physical page is "1" if the physical page is available for storing new data, and "0" otherwise.

Figure 7:
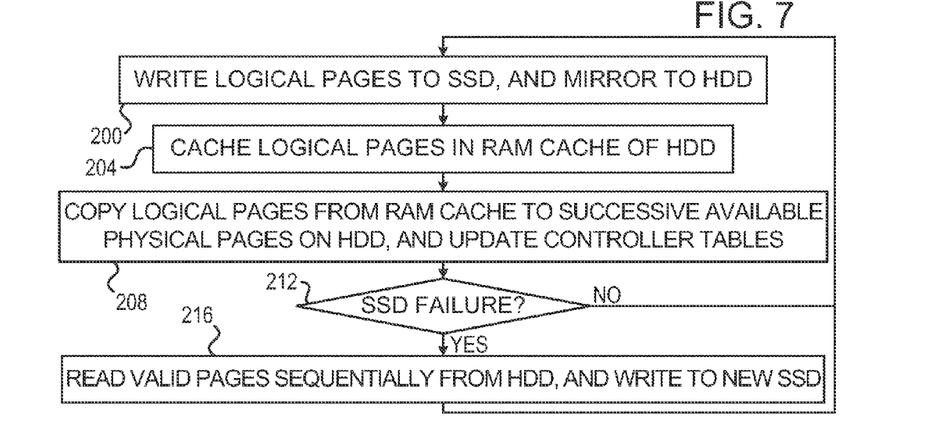
FIG. 7 is a flow chart that schematically illustrates a method for data storage and retrieval, in accordance with another embodiment of the present invention.

FIG. 7 is a flow chart that schematically illustrates a method for data storage and retrieval in system 168, in accordance with another embodiment of the present invention. The method begins with controller 170 storing data in SSD 174 and sending the data for back-up in HDD 178, at a storage step 200. Each data page has a certain logical address, which is used for storing the data page in the SSD. The data pages are also referred to herein as logical pages for clarity.

HDD 178 caches the logical pages received from controller 170 in RAM cache 182, at a HDD caching step 204. The HDD then copies the logical pages to physical pages in media 186, at a HDD storage step 208. When copying the logical pages, the HDD stores the logical pages in successive available physical pages on media 186. Typically, the HDD head is moved, and the pages read from the RAM cache are stored in successive physical pages traversed by the head, while skipping unavailable physical pages (pages whose AvailabilityTable entry is "0").

When a logical page L (i.e., a page whose logical address in SSD 174 is L) is backed-up in a physical HSS page X, the HSS stores the logical address of this page (or an indication of this address) is stored in the same physical HDD page together with the data. In addition, the PointerTable and AvailabilityTable tables are updated as follows:

AvailabilityTable(X) is set to "0", to indicate that physical HDD page X now holds up-to-date data and is not available for storing data.

AvailabilityTable(PointerTable(L)) is set to "1", to indicate that the previous physical page in which logical page L was stored is now available for storing new data.

PointerTable(L) is set to X, to indicate that logical page L is backed-up in physical page X in the HDD.

At a certain point in time, controller 170 initiates a restoration process, which restores the data from HDD 178 to another SSD. This process may be triggered by various kinds of failures, such as, for example, failure to program data, failure to read data, a notification of SSD failure, or for various other reasons. In the present example, controller 170 checks failure has occurred, at a failure checking step 212. If no failure has occurred, the method loops back to step 200 above, and controller 170 continues to store data in SSD 174 and back-up the data in HDD 178.

If, on the other hand, failure was detected at step 212, controller 170 reads the data that is backed-up in HDD 216 and stores the restored data in another SSD, at a restoration step 216. When reading the data from the HDD, the data is read sequentially from successive physical pages (and thus reducing unnecessary HDD head movements and the associated reading time). The readout process typically skips physical pages whose AvailabilityTable entry is "1".

When reading the data from a given HDD physical page, the indication of the logical address (that was stored together with the data at step 208) is read from this page, as well. The restored data is written to the new SSD according to these logical addresses.

In summary, the method of FIG. 7 stores data items having respective logical addresses (that are not necessarily sequential) in sequential available physical storage locations on a storage device. When storing a data item, an indication of its logical address is stored, as well. When retrieving a given data item, the corresponding logical address can be read and used.

The above-described scheme can be extended and used in various other systems and applications. For example, this scheme can be used in storage systems having multiple SSDs, e.g., RAID systems that produce parity pages. In an example implementation, the parity pages produced in such a system can be stored on HDD, whereas the data pages can be stored on SSD. The method of FIG. 7 can be used to write the parity pages sequentially (and thus at high speed) into the HDD, and to recover from loss of data pages or from SSD failures. Consequently, the random write performance of the system is improved considerably.

The method of FIG. 7 can also be used in HDD-based RAID systems, e.g., in order to improve their random write performance. For example, all parity pages can be stored on a single HDD using the method of FIG. 7, i.e., sequentially and at high speed. Unlike known HDD-based RAID systems in which each random write operation requires modification of data in one disk and a parity in another disk, when using the disclosed method only one of the disks has to move. This technique can improve the random write performance of an HDD RAID array by a factor of two (since every random write operation occupies only the data HDD for a seek time duration, while in the conventional solution every random write operation occupies two HDDs (both the data and the parity HDDs) for a seek time duration).

In another embodiment of a RAID system, both data and parity pages can be stored in the different storage devices using the method described of FIG. 7. As a result, both data and parity information is stored sequentially and at high speed, even when the logical addresses of the pages are not sequential. Further alternatively, the method of FIG. 7 can be used for storing data on a single storage device, in order to improve random write performance.

Although the description of FIGS. 6 and 7 above focused on SSDs and HDDs, the disclosed techniques are in no way limited to these types of storage devices, and may be used with various other storage device types. In some embodiments, a RAID system may store the parity pages in Single-Level Cell (SLC) SSD, and the data pages in Multi-Level Cell (MLC) SSD. As another example, parity pages and data pages can be stored in the same SSD, but in separate blocks. The separate blocks are regarded as separate storage devices in this context. For example, parity pages can be stored in SLC blocks, and data pages can be stored in MLC blocks, in the same SSD or on multiple SSDs. In still another embodiment, both parity and data pages are stored in MLC blocks, but the system assigns separate blocks for parity and for data in order to improve write efficiency. Further additionally or alternatively, any other suitable types of storage devices can be used.

Moreover, the technique of FIGS. 6 and 7 is not limited to backup applications or to the use of multiple storage devices, and can be used to improve the random write performance of a single storage device, as well. Consider, for example, a storage device that is controlled by a controller. The storage device in the present example has high sequential write performance, but relatively poor random write performance. Such a device may comprise, for example, a HDD or magnetic tape.

In some embodiments, the controller accepts data items, together with respective logical addresses (logical storage locations) of the data items, for storage on the storage device. The controller stores the data items, together with respective indications of the logical addresses, at successive available physical storage locations on the storage device. Since this storage operation is performed on successive physical storage locations and not on random locations, the storage speed is relatively high. For example, in a HDD, writing into sequential physical storage locations can typically be performed without unnecessary mechanical movement of the HDD head.

When requested to retrieve one or more data items from certain logical addresses, the controller reads the data items sequentially from the physical locations on the storage device. Each data item is retrieved with the corresponding indication of its logical address. Using the indications, the controller outputs the data items corresponding to the requested logical addresses.

The above-described technique provides a considerable improvement in random write performance. In some cases, this improvement comes at the expense of some degradation in read performance. In many applications, however, this degradation is tolerable. This technique may therefore be particularly suitable for applications that are insensitive to reading speed, such as some remote backup applications.

Typically, controllers 24 and 170 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory.

In some embodiments, the controller and the storage devices support a command interface, using which the controller notifies a given storage device whether a given data item contains data or parity (or other redundancy). This interface is useful, for example, when both parity pages and data pages are stored on the same storage device but in different blocks. The storage device in question can determine where and how to store a given page based on its role (data or parity), as notified by the controller. This interface can be used in any system configuration, such as in system 20 of FIG. 1 above and system 168 of FIG. 6 above.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data storage, comprising:
receiving data items having respective logical storage locations for storage on a storage device;
storing the data items, together with respective indications of the logical storage locations, at successive available physical storage locations on the storage device; and
retrieving the data items from the storage device by reading the data items and the respective indications sequentially from the storage device, and outputting the read data items according to the indications.

2. The method according to claim 1, wherein the data items comprise parity pages, which are produced from data pages that are stored on at least one other storage device.

3. A method for data storage, comprising:
storing data items having respective logical storage locations on a first storage device;

backing-up the data items on a second storage device by storing the data items, together with respective indications of the logical storage locations, at successive available physical storage locations on the second storage device; and upon a failure in the first storage device, restoring the data items from the second storage device by reading the data items and the respective indications sequentially from the second storage device, and storing the read data items on a third storage device according to the indications.

4. The method according to claim 3, wherein the first storage device comprises a Solid State Disk (SSD).

5. The method according to claim 3, wherein the second storage device comprises a Hard Disk Drive (HDD).

6. The method according to claim 3, wherein backing-up the data items comprises holding a data structure indicating the available physical storage locations on the second storage device, and wherein storing the data items at the successive available physical storage locations comprises skipping physical storage locations that are indicated by the data structure as unavailable.

7. The method according to claim 3, wherein storing and backing-up the data items comprise notifying one of the first and second storage devices whether a given data item comprises data or redundancy information.

8. Apparatus for data storage, comprising:

a storage device; and a controller, which is configured to receive data items having respective logical storage locations for storage on the storage device, to store the data items, together with respective indications of the logical storage locations, at successive available physical storage locations on the storage device, and to retrieve the data items from the storage device by reading the data items and the respective indications sequentially from the storage device, and outputting the read data items according to the indications.

9. The apparatus according to claim 8, wherein the data items comprise parity pages, which are produced from data pages that are stored on at least one other storage device.

10. Apparatus for data storage, comprising:

first and second storage devices; and a controller, which is configured to store data items having respective logical storage locations on the first storage device, to back-up the data items on the second storage device by storing the data items, together with respective indications of the logical storage locations, at successive available physical storage locations on the second storage device, and, upon a failure in the first storage device, to restore the data items from the second storage device by reading the data items and the respective indications sequentially from the second storage device, and to store the read data items on a third storage device according to the indications.

11. The apparatus according to claim 10, wherein the first storage device comprises a Solid State Disk (SSD).

12. The apparatus according to claim 10, wherein the second storage device comprises a Hard Disk Drive (HDD).

13. The apparatus according to claim 10, wherein the controller is configured to hold a data structure indicating the available physical storage locations on the second storage device, and to store the data items at the successive available physical storage locations by skipping physical storage locations that are indicated by the data structure as unavailable.

14. The apparatus according to claim 10, wherein the controller is configured to notify one of the first and second storage devices whether a given data item comprises data or redundancy information.

* * * * *